Figure 6:
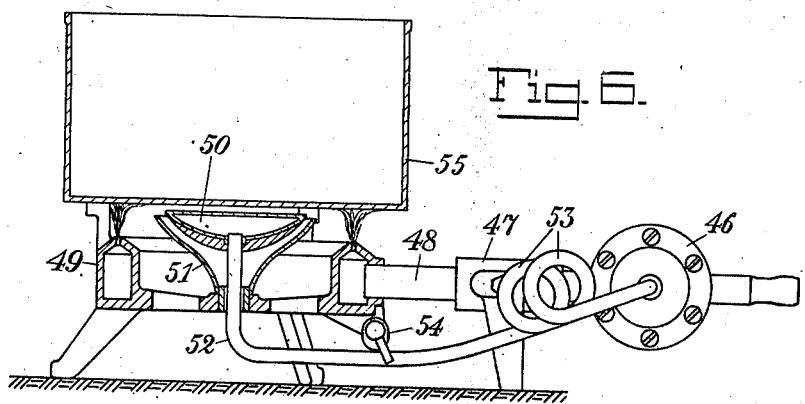

H. JUNKERS.
GAS COOKING DEVICE WITH HEAT REGULATOR.
APPLICATION FILED AUG. 6, 1907.
947,914.
Patented Feb. 1, 1910.
2 SHEETS—SHEET 1.
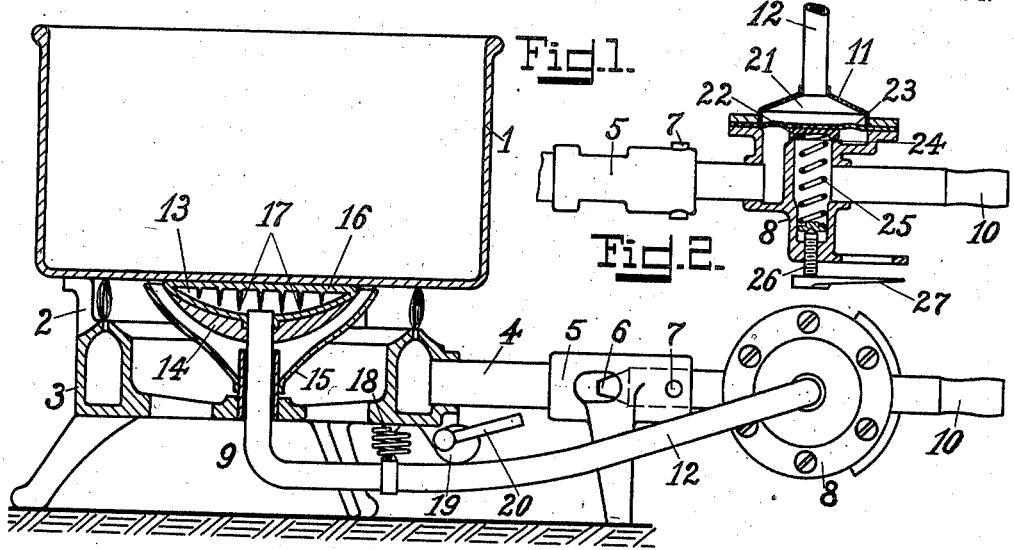
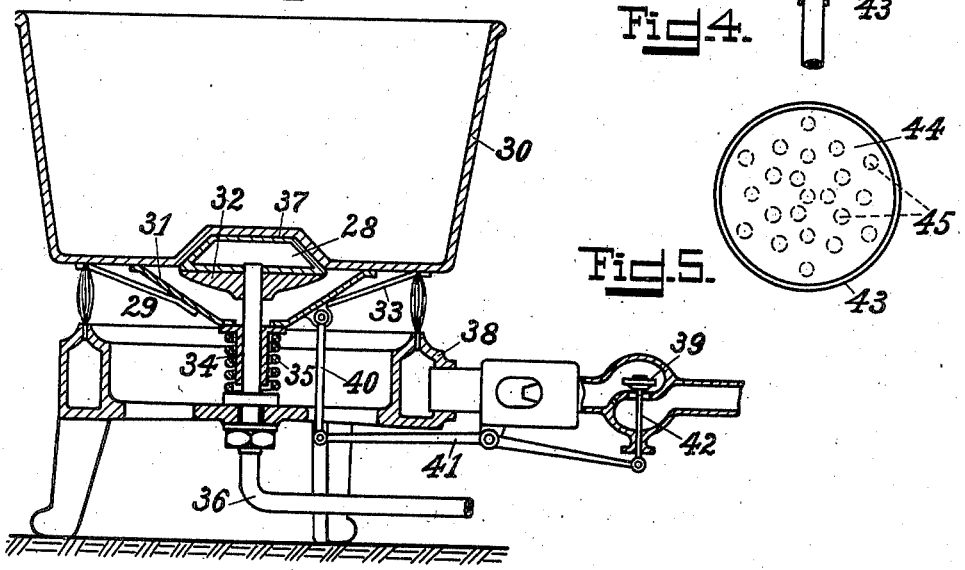
Witnesses:
F. G. Harder.
A. Frank
Inventor:
Hugo Junkers
per Martin Schmetz,
Attorney.

H. JUNKERS.
GAS COOKING DEVICE WITH HEAT REGULATOR.
APPLICATION FILED AUG. 6, 1907.

947,914.

Patented Feb. 1, 1910.

2 SHEETS—SHEET 2.

Witnesses:
F. G. Harder
R. Schoebel.

Inventor:
Hugo Junkers.
per: Martin Schmetz
Attorney.

UNITED STATES PATENT OFFICE.

HUGO JUNKERS, OF AIX-LA-CHAPELLE, GERMANY.

GAS COOKING DEVICE WITH HEAT-REGULATOR.

947,914.  Specification of Letters Patent.  Patented Feb. 1, 1910.

Application filed August 6, 1907. Serial No. 387,269.

*To all whom it may concern:*

Be it known that I, HUGO JUNKERS, professor in the Royal Polytechnicum at Aix-la-Chapelle, Germany, a subject of the King of Prussia, residing at No. 64 Brabantstrasse, Aix-la-Chapelle, in the Kingdom of Prussia, Empire of Germany, have invented certain new and useful Improvements in Gas Cooking Devices with Heat-Regulators; and I do hereby declare the following to be a full, clear, and exact description of the invention, such as will enable others skilled in the art to which it appertains to make and use the same.

My present invention relates to gas cooking devices and particularly to the kind provided with a heat regulator.

The object of my invention is to produce a gas cooking device, which can be conveniently handled by the laity and utilized in the kitchen with any kind of cooking-vessels, and by means of which food may be prepared by boiling, roasting, frying, baking and so forth on regulating the temperature accordingly. As the part of the regulator sensitive to heat contacts with the lowest, *i. e.* the hottest part of the wall of the cooking-vessel, said regulator will prevent the burning of the food better than a regulator whose sensitive part is brought into bodily contact with the food. The cooking-vessel remains completely free and can therefore be at will placed on or removed from the cooker, as no tube-connection is to be made or broken. Pipes and tubes which accidentally might come into contact with the flame are not present, and as the regulator does not need to be handled its durability is not endangered. In some of the embodiments of my invention the heat regulator may be brought into contact with the cooking-vessel at pleasure, so that for instance the food may first be cooked for any desirable length of time by means of a fully developed flame and then kept warm by the aid of the regulator.

The new gas cooking device essentially consists of a gas cooker of usual construction combined in an ingenious manner with an essentially known heat regulator to form a convenient whole and to permit that during or after the putting on of the cooking-vessel the part of the regulator sensitive to heat can be brought into a heat-transmitting contact with the lower part of the cooking-vessel, usually the bottom surface thereof. Said sensitive part of the heat regulator generally has the shape of a capsule filled with a liquid. This heat-transmitting connection can be either a direct one or an indirect one. In the latter case a body made of a good heat conductor is interposed between said capsule and the bottom of said cooking-vessel. The new gas cooking device is further provided with means which warrant a good heat conducting connection between the cooking-vessel and the regulating medium. There may also measures be taken to switch the regulator in and out, or to screw the gas down by mechanical means after the cooking-vessel has been removed, *i. e.* when the regulator-capsule is out of contact with any heated part, as customarily it is done in cooking devices without any regulating means.

Figure 7:
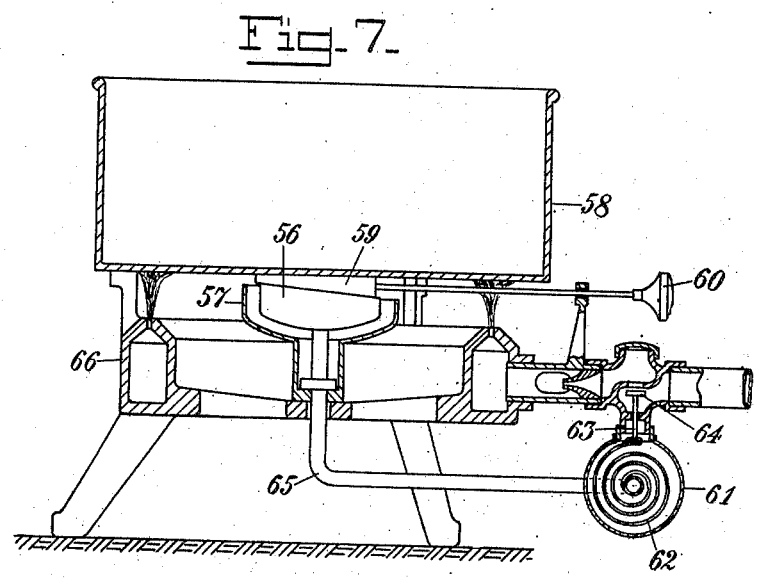

In the accompanying drawings:—Figure 1 is a vertical sectional view of an embodiment of my invention, partly shown in elevation. Fig. 2 is a vertical sectional view of a known regulating device of the heat regulator. Fig. 3 is a vertical sectional view of another embodiment of my invention. Fig. 4 is a sectional view of a heat regulator capsule provided with tubular channels. Fig. 5 is a plan-view of the heat-regulator capsule shown in Fig. 4 in section. Figs. 6 and 7 are modifications of my present invention.

In the embodiment of my invention shown in Fig. 1 the cooking-vessel 1 is placed on the lugs 2 of the cooker 3 of customary construction. To the annular casing of the cooker 3 a nipple 4 with a socket 5 is secured, into which the nozzle 6 is inserted and pivotally connected therewith by means of the pins 7. The nozzle 6 carries the regulating-device 8 of the heat regulator 9 and said device is provided with a mouth-piece 10 for the attachment of a rubber-tube to convey gas to said regulating-device. From the cap 11 of this regulating-device a pipe 12 branches off and carries on its free end the capsule 13, which forms that part of the heat regulator which is most sensitive to heat. The bottom-side of this capsule is covered with an insulating-material 14 which prevents the heat radiated by the flames from influencing the capsule 13 and to prevent this all the more effectively, a mantle 15 is provided. The inside of the capsule-cover 16 is provided with ribs or prongs 17 to improve the transmission of heat from the capsule to the liquid contained therein even if the surface of the liquid should have been lowered through the formation of steam or a collection of air within said capsule. A spring 18 serves to create in the pipe 12 and in the capsule 13 the tendency to rise, so that the contact of the capsule with the bottom of the cooking-vessel 1 may become very intimate. It is evident that the spring 18 might be replaced by other means, which can be accomplished in the simplest manner by a resilient pipe 12, in which case the pins 7 for the pivotal support of the nozzle 6 are made superfluous. To bring the capsule 13 out of contact with the bottom of the cooking-vessel the eccentric 19 is arranged on the cooker 3 and can be rotated by means of the handle 20. The separation of cooking-vessel and capsule might of course be accomplished by fixedly arranging the capsule 13 at a given distance below the bottom of the cooking-vessel, and the heat conductive connection formed by means of a piece of metal inserted between the capsule and the bottom of the cooking-vessel.

In Fig. 2 the regulating device 8 is shown in section to illustrate its construction more clearly. It consists of a pressure chamber 21 filled with a liquid or with a gas and is closed toward the gas-valve 22 by a membrane 23. The valve 22 can be raised off its seat 24 by the spring 25 whose tension may be regulated by means of the screw 26 manipulated by the handle 27. The operation of this regulating device is as follows:—When the contents of the cooking-vessel have been heated, the heat of the latter is transmitted through its bottom to the capsule 13, and in consequence thereof the liquid contained therein is expanded or forms gases. The pressure created thereby is transmitted through the pipe 12 to the pressure chamber 21 and thus the membrane 23 is bulged outward and the valve 22 seated. As during this position of the valve very little gas can reach the cooking device the flames must grow small. It is evident that instead of the membrane a so called Bourdon's tube or other equivalent means might be employed to close said valve.

Fig. 3 shows another embodiment of my invention. In this case it is not the regulating capsule 28 which is movably arranged, but the carrier 29 by which the cooking-vessel 30 is supported. The carrier consists of a mantle 31, which protects the capsule 28 covered at the bottom by the insulating material 32 against the heat of the gas-flames. The mantle is provided with arms 33 and connected with the flanged sleeve 34 supported by the spring 35. The pipe 36 which supports the capsule 28 is identical with the pipe 12 of Fig. 1 and leads to a regulating device similar to the one shown in Fig. 2. When the cooking-vessel is placed on the carrier the latter sinks so that an intimate contact between capsule and cooking-vessel is obtained. The bottom of the latter is in this case provided with a recess 37 for the reception of the truncated capsule 28. The gas-cooker 38 is provided with a gas-valve 39 which is closed when the cooking-vessel 30 is removed. The carrier 29 rises in this instance and transmits its motion by means of the link 40 and the lever 41 to the spindle 42 of the valve 39. It is evident that this arrangement might be executed in a different manner too.

In Figs. 4 and 5 a construction of another capsule 43 is shown, whose cover 44 is provided with tubular channels 45 by means of which the transmission of heat to the liquid contained in said capsule is improved and made possible even if the surface of the liquid should have been lowered through the formation of steam or a collection of air within said capsule.

Another modification of my gas cooking-device is shown in Fig. 6, wherein the regulating-device is not pivotally arranged, and the pipe which connects said device with the capsule is not operated by a spring as shown in Fig. 1, but wherein the regulating-device 46 is rigidly connected with the socket 47 of the nipple 48 carried by the cooker 49, and wherein also the capsule 50, surrounded by a mantle 51, is carried by a pipe 52 made resilient by means of the windings 53. The eccentric 54 is here set to interrupt the contact between the cooking-vessel 55 and the capsule 50, i. e. the device for regulating the temperature is put out of action, as is the case when it is desirable to obtain a higher temperature (for roasting) when the regulating-device was previously set for a low temperature (for boiling).

In Fig. 7 still another modification of my invention is shown, wherein the capsule 56 is rigidly supported within the mantle 57. To make and break contact between the capsule 56 and the bottom of the cooking-vessel 58 a wedge-shaped metallic contact-block 59 is provided, which may be adjusted at pleasure by moving it back or forth by the aid of the button 60. In this modification of my invention the regulating-device 61 is constructed differently from the one shown in Fig. 2, as instead of the membrane 23 a so called Bourdon tube 62 is employed, which carries at its outer end the spindle 63 of the valve 64. The latter is raised i. e. closed, when the capsule 56 is heated, whereby the fluid contained in the latter expands and thus transfers its pressure to the Bourdon tube by way of the pipe 65. The cooker 66 carries all the coöperative parts in their relative position to each other.

The embodiments of my invention illustrated in the drawings are of course only some of the many possible, because the several parts of my invention might be executed in a variety of ways, without departing from the spirit of my invention.

I claim:—

1. A gas cooking device comprising a gas-cooker; a thermostatic heat-regulator consisting of a capsule containing a fluid and adapted to establish a heat-transmitting contact with the lower portion of a cooking-vessel, and a regulating-device operated by the fluid of said capsule; and means for protecting said capsule from the heat radiated by the flames of said gas-cooker and by the latter itself.

2. A gas cooking device comprising a gas-cooker; a thermostatic heat-regulator consisting of a capsule containing an expansible fluid and adapted to establish a heat-transmitting contact with the underside of a cooking-vessel, and a regulating device connected by a tubular connection with said capsule and operated in accordance with the expansions and contractions of said fluid; and a mantle for protecting said capsule from the heat radiated from the flames of said gas-cooker and by the latter itself.

3. A gas cooking device comprising a gas-cooker; a thermostatic heat-regulator consisting of a capsule provided with means for making and breaking a heat-transmitting contact with the bottom of a cooking-vessel and containing a permanently inclosed fluid expanding when conductive-relations have been established between said capsule and said cooking-vessel, and a regulating-device communicating with said capsule and adapted to be operated by the pressure generated by said fluid when expanded by the heat transmitted from said cooking-vessel to said capsule; and means preventing the heat radiated by the flames of said gas-cooker and by the latter itself from influencing the operation of said capsule.

4. A gas cooking device comprising a gas-cooker; a thermostatic heat-regulator consisting of a capsule adapted to establish a heat-transmitting contact with the bottom of a cooking-vessel and containing a fluid expanding when transmission of heat from said cooking-vessel to said capsule takes place, means in said capsule for keeping said fluid conductively related with the top of said capsule, and a regulating-device adapted to be operated by the pressure generated by said fluid when operated by the heat transmitted from said cooking-vessel to said capsule; means for preventing the heat radiated by the flames of said gas-cooker to reach said capsule; and means for making and breaking the contact between said capsule and said cooking-vessel.

In testimony whereof I have signed my name to this specification in the presence of two subscribing witnesses.

HUGO JUNKERS.

Witnesses:
 HENRY QUADFLIEG,
 ELISE KALBUSCH.